(No Model.)
S. M. FRIEDE.
COMBINATION HARD AND SOFT METAL PIPE COUPLER.
No. 502,665. Patented Aug. 1, 1893.
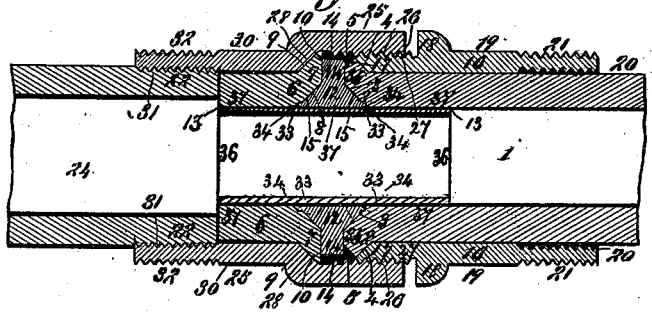
Fig. I.
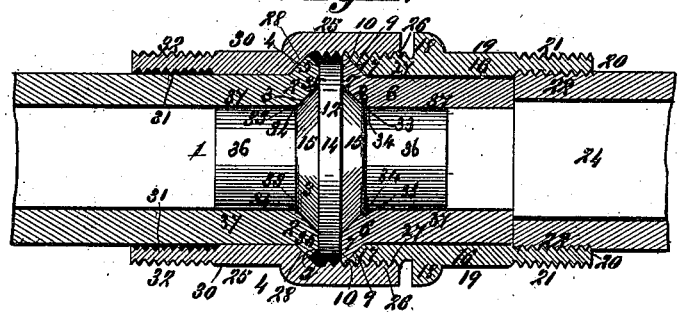
Fig. II.
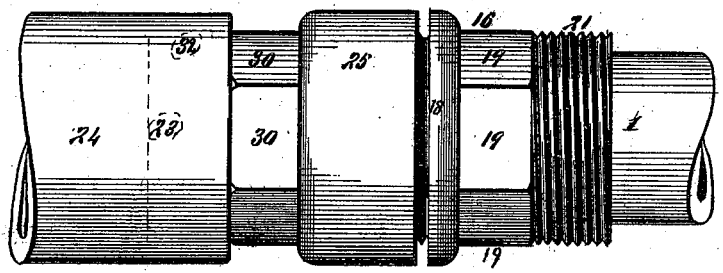
Fig. III.
Attest:
Benj. A. Knight.
Halcolm G. Ellis.
Inventor:
Samuel M. Friede.
By Knight Bros.
Atty's.

UNITED STATES PATENT OFFICE.

SAMUEL M. FRIEDE, OF ST. LOUIS, MISSOURI, ASSIGNOR OF ONE-HALF TO ISAAC G. BROWN, OF SAME PLACE.

COMBINATION HARD AND SOFT METAL PIPE COUPLER.

SPECIFICATION forming part of Letters Patent No. 502,665, dated August 1, 1893.

Application filed April 17, 1893. Serial No. 470,611. (No model.)

*To all whom it may concern:*

Be it known that I, SAMUEL M. FRIEDE, a citizen of the United States, residing in the city of St. Louis and State of Missouri, have invented a certain new and useful Improvement in Combination Hard and Soft Metal Pipe Couplers, of which the following is a full, clear, and exact description, reference being had to the accompanying drawings, forming part of this specification.

This invention relates to union joints for lead and hard metal pipes, in which the lead pipe and an intermediary short lead pipe or ring each having expanded or bevel lips of equal thickness to their joint ends, with the thickness of the body of said pipe, and in which a hard metal gasket with an extension periphery provides base and square fits for the ends of said lips, and the bevel and square outline edges of the metal gasket, swage their way into the soft junction of the lead sections. Union coupling collars are provided with peripheral and internal screw-threads, and their bevel ends engage and press against the bevel shoulders of the lead lips; the outer terminals of these collars being provided with internal and external screw-threaded surfaces for attachment for the respective connections required for the hard metal pipe to be coupled. An internal tube-shell reinforces the joint; and the invention consists in features of novelty hereinafter fully described and pointed out in the claims.

In the drawings:—Figure I is a transverse section. Fig. II is a transverse section showing the pipes to be coupled in reverse position and the gasket in elevation. Fig. III is an elevation of the coupling showing the hard metal pipe surrounding the major coupling collar.

Referring to these drawings:—1 represents a section of lead pipe, and 2 is the bevel lip at the joint end of said section. This expansive lip has a beveled inner surface 3 and beveled outer surface 4, with an end 5 that is at a right angle to said inside and outside bevel surfaces.

6 represents the lead intermediary collar or short intervening section, which is also provided with a lip 7, at its forward end, which also has an inner edge 8, an outer edge 9, and the forward edge 10, which latter is at a right angle to the inner and outer line of the body 11 of this short section of pipe.

12 represents a close joint gasket, which is preferably made of brass, but may be of any other hard metal. This gasket is provided with a bore 13 preferably of the same diameter with that of the lead pipes with which it engages.

14 is a central rectangular extension of the gasket and 15 are the bevel side extension edges that fit closely on each side to the bevel edges of the lead pipe 1 and the lead collar 6.

16 is the minor coupling collar, (which is preferably of brass, but which may be of any other hard metal,) the beveled inner coupling end 17 of which respectively engages with the bevel edge 4 of the lipped lead section 1, as shown in Fig. I, or in its transposed position Fig. II, it engages with the outer edge 9 of the lipped collar 6.

18 is a projecting peripheral rim around the minor coupling collar, and 19 is its octagonal wrench seat.

20 represents the inner screw-thread and 21 the outer screw-thread on the outer end of this coupling collar, to use when the collar either engages with the outer screw-thread 22, or with the inner screw-thread 23 of the iron or other hard metal pipe section 24.

25 represents the major coupling collar, also preferably of brass, its screw-thread 26 engaging with the outer screw-thread 27 of the minor coupling collar.

28 represents a bevel inwardly projecting joint seat within the bulge end 29 of the major coupling collar, which respectively engages with the beveled edge 9 of the lipped lead intermediary collar 6, as shown in Fig. I, or in its transposed position it engages with the outer edge 4 of the lead section 1, as shown in Fig. II. 30 points out the octagonal wrench seat around the major collar. 31 represents an inner thread and 32 an outer screw-thread on the outer end of this collar, for use when said collar engages with the outer screw-thread 22 of the iron or other hard metal pipe 24, as shown in Fig. I, or with the inner screw-thread 23 of said pipe, as shown in Fig. III.

33 represents spurs at the foot of the bevel side edges 15 of the hard metal gasket, which spurs, as the coupling joint is screwed home swage into the respective surfaces of the bevel joint seats 3 of the main lead pipe 1, and of 8 of the lead collar 6, making curved recessed seats 34 therein. At the same time, while the respective major and minor coupling collars are being advanced in their screw-seated connections, and as already stated, under their tight embracing force, the hard metal spurs of the gasket swage into the soft lead seats of the pipe and intermediary collar, and also as the hard metal of one side of the rectangular extension 14, of the gasket comes into frictional contact with the projecting edge produced by the meeting of the diverse lines 3 and 5 of the expansive lip of the lead pipe 1. This hard surface 14 also swages off the projecting edge of the sharp angle joint formed by lines 3 and 5 and effects an additional light coupling surface 35 between the gasket and lip.

36 is a hard metal tube-shell fitting tightly within the gasket and lead pipe sections and serves to reinforce the coupling and prevent bulging of the lead sections.

The operation of the coupling has been mostly indicated in the description of the several parts, but it may be further stated that the device is designed especially to couple hard to soft metal pipes, that it effectively secures an instantaneous tight joint of the same, without the use of solder.

It will be seen that in the action of effecting a tight joint, some of the elements of this device are swaged in the operation of closing, and that said joint is made by the one operation, without, as with the other tight joints, requiring an after process of soldering. Also in this device and again, unlike a solder joint, this joint can be made with about equal facility under water, as above, and in cramped positions in close contact with other bodies, where it would be impossible to get access to make a solder joint. In making the joint, it is preferable that the coupling collar, the rear screw of which engages with either the outer or inner screw of the iron or hard metal pipe 24, should be first seated in position on said pipe, and the gasket 12 mounted midway on the reinforcing tube 36. The intermediate lead collar 6 is then placed in position with the bevel edge 9 of lip 7, in contact with the forward bevel edge of the coupling collar. The intervening close bevel gasket 12, with its tube or shell 36, is then placed in position, and the lead pipe 1, with the corresponding coupling collar mounted thereon, being on line with the hard metal pipe and its coupling collar, then by means of wrenches are brought into engagement with each other and turned until a close joint is effected. In this final close of the operation, the spurs 33 of the hard metal gasket are swaged into their recessed seats 34 in the said lead pipe 1, and intermediate lead collar 6, and at the same time one side of the rectangular extension 14 of said hard metal gasket comes into frictional contact with and swages off the projecting angle edge produced by the meeting of the diverse lines 3 and 5 of the expansive lip of lead pipe 1, and effects an additional tight coupling surface 35, between said gasket and said expansive lip as before described. Also the reinforcing hard metal tube or shell that is internally bedded within the soft metal coupling pipe at its joint, so reinforces the joint that it cannot either bend or break, under adverse circumstances as in the settling of a wall in the building; and consequently said junction cannot crack or work the joint loose. Unlike a solder joint, when from any cause it is desired to disconnect the parts it can be almost instantaneously effected by a wrench in my invention without injury to either pipe or joint, which can as rapidly be closed again.

Having thus described my invention, what I claim as new therein, and desire to secure by Letters Patent, is—

1. In a pipe coupler, the combination of the lead pipe 1 having the bevel lip 2, the intermediate lead collar 6 having the bevel lip 7, the intervening hard metal gasket 12, the minor screw coupling collar 16, and the major screw coupling collar 25; substantially as described.

2. In a pipe coupler, the combination of the lead pipe 1, having the expansion lip 2 with the inner bevel 3 and the outer bevel 4, the intermediate lead collar 6, having the expansion lip 7, with the inner bevel 8, and the outer bevel 9, the intervening hard metal bevel swage gasket 12, the said gasket having the bevel side extension edges 15, and the rectangular peripheral extensions 14; the minor screw coupling collar 16, having the bevel 17, and the major screw coupling collar having the bevel 28; substantially as described.

3. In a pipe coupler, the combination of the lead pipe 1, having the inner and outer bevels, the intermediate lead collar 6 having the expansion inner and outer bevels, the hard metal gasket 12 having the bevel faces 15, the spurs 33 on said bevels, the said hard metal spurs providing their own recess seats 34, in said lead pipe and in said lead collar, the swaged joint surface 35, and the minor and major coupling screw collars, with their bevel seats; substantially as described.

4. In a pipe coupler, the combination of the lead pipe 1 having the bevel lip, the lead collar 6 having a bevel lip, the hard metal gasket having the bevels 15, spurs 33 and peripherally extending rim 12, the minor coupling collar 16 having the bevel 17 and coupling screw thread 27 at its front end and the inner screw thread 20, and the outer screw thread 21, at its rear end, the major coupling collar 25, having the bevel 28 and the inner screw thread 26 at its front end, and the inner screw thread 31 and the outer screw thread at its rear end, and the iron pipe 24, having the outer screw thread 22, that engages with the inner screw thread 20 of said minor coupling collar and with the inner screw thread 31 of said major coupling collar; substantially as described.

5. In a pipe coupler, the combination of the lead pipe 1 having the bevel lip, the lead collar 6, having the expansion bevel lip, the hard metal gasket having the expansion bevels 15, spurs 33 and peripherally extending rim 12, the said spurs, swaging into their recessed seats 34 in the lead pipe and lead collar, and said rim 12 swaging its seat 25 in the expansive lip 2 of said lead pipe 1, the minor coupling collar 16, having the bevel 17 and coupling screw thread 27 at its front end, and the inner and outer screw threads 20 and 21 at its rear end, the major coupling collar 25 having the bevel 28, and the inner screw thread 26 at its front end, and the inner screw thread 31 and the outer screw thread 32 at its rear end, and the hard metal pipe having the inner screw thread 23, that engages with the outer screw thread 21, of said minor coupling collar, and with the outer screw-thread 32 of said major coupling collar; substantially as described.

6. In a pipe coupler, the combination of the lead pipe 1, having the bevel expansion lip 2, the intermediate lead collar 6, having the bevel expansion lip 7, the intervening hard metal gasket 12 having the rectangular peripheral extension 14, the minor screw coupling collar 16 having the screw threads 20, 21 and 27, the projecting peripheral rim 18 and the wrench seat 19, the major coupling collar 25, having the bulge projection 29 of its coupling end, the screw threads 26, 31, and 32, and the wrench seat 30, substantially as described.

7. In a pipe coupler, the combination of the lead pipes 1 and 6, the bevel gasket 12, and the internal reinforcing and spanning tube-shell 36; substantially as described.

8. In a pipe coupler, the combination of the lead pipe 1, having the bevel expansion lip 2, the intermediate lead collar 6, having the bevel expansion lip 7, the intervening hard metal gasket 12, having the swaging spurs 33, the minor screw coupling collar 16, the major screw coupling collar 25, and the internal reinforcing tube-shell 36; substantially as described.

9. In a pipe coupler, the combination of the lead pipe 1, having the bevel expansion lip 2, the intermediate lead collar 6, said collar having the beveled expansion lip 7, the intervening hard metal gasket 12, said gasket having the swaging spurs 33, the bevels 15, and the peripheral rim 14, the inner screw coupling collar 16, having the bevel 17, and coupling screw-thread 27 at its front end, and the inner screw-thread 20 and outer screw-thread 21 at the rear end, the major coupling collar 25, having the bevel 28, and the inner screw-thread 26 at its front end, and inner screw-thread 31 and outer screw-thread 32 at its rear end, the hard metal pipe 24, having a screw-thread that engages with one of said coupling collars, and the reinforcing internal tube-shell; substantially as described.

SAMUEL M. FRIEDE.

In presence of—
BENJN. A. KNIGHT,
ALBERT M. EBERSOLE.